United States Patent
Marupaduga et al.

(10) Patent No.: US 11,445,571 B1
(45) Date of Patent: Sep. 13, 2022

(54) TOWER MOUNTED AMPLIFIER (TMA) CONTROL BASED ON USER EQUIPMENT (UE) CONCENTRATION

(71) Applicant: T-MOBILE INNOVATIONS LLC, Overland Park, KS (US)

(72) Inventors: Sreekar Marupaduga, Overland Park, KS (US); Rajveen Narendran, Olathe, KS (US)

(*) Notice: Subject to any disclaimer, the term of this patent is extended or adjusted under 35 U.S.C. 154(b) by 67 days.

(21) Appl. No.: 17/148,983

(22) Filed: Jan. 14, 2021

(51) Int. Cl.
*H04W 88/08* (2009.01)
*H04W 28/18* (2009.01)
*H04W 4/70* (2018.01)
*H04W 52/38* (2009.01)
*H04W 52/36* (2009.01)

(52) U.S. Cl.
CPC ........... *H04W 88/085* (2013.01); *H04W 4/70* (2018.02); *H04W 28/18* (2013.01); *H04W 52/367* (2013.01); *H04W 52/383* (2013.01)

(58) Field of Classification Search
CPC ..... H04W 88/085; H04W 4/70; H04W 28/18; H04W 52/367; H04W 52/383
See application file for complete search history.

(56) References Cited

U.S. PATENT DOCUMENTS

| | | | |
|---|---|---|---|
| 9,706,498 B2 | 7/2017 | Lee et al. | |
| 9,781,584 B2 | 10/2017 | Nagata et al. | |
| 9,807,710 B2 | 10/2017 | Seo et al. | |
| 9,832,776 B2 | 11/2017 | Peng et al. | |
| 10,582,512 B2 | 3/2020 | Panaitopol | |
| 2013/0176874 A1 | 7/2013 | Xu et al. | |
| 2014/0126530 A1 | 5/2014 | Siomina et al. | |
| 2022/0038067 A1* | 2/2022 | Yoo | H03F 3/245 |
| 2022/0103332 A1* | 3/2022 | Jung | H04L 5/0041 |

* cited by examiner

*Primary Examiner* — Jamal Javaid
*Assistant Examiner* — Shawn D Miller

(57) ABSTRACT

A Radio Access Network (RAN) is configured to serve wireless User Equipment (UEs). The RAN comprises a Baseband Unit (BBU) and a Tower Mounted Amplifier (TMA). The BBU determines an amount of proximate wireless UEs that have transmit power levels that fall below a proximity threshold and when the amount of the proximate UEs exceeds a concentration threshold. When the proximate UEs exceeds the concentration threshold, the BBU schedules the proximate wireless UEs to use proximate UE Transmit Time Intervals (TTIs) and schedules other wireless UEs to use other TTIs. The BBU transfers control signals to deactivate TMA amplification during the proximate UE TTIs and to activate the TMA amplification during the other TTIs. The TMA receives UE signals, and in response to the control signals, deactivates TMA amplification on UE signals during the proximate UE TTIs and activates TMA amplification on UE signals during the other TTIs.

20 Claims, 6 Drawing Sheets

TOWER MOUNTED AMPLIFIER (TMA) CONTROL BASED ON USER EQUIPMENT (UE) CONCENTRATION

TECHNICAL BACKGROUND

Wireless communication networks provide wireless data services to wireless user devices. Exemplary wireless data services include machine-control, Internet-access, media-streaming, and social-networking. Exemplary wireless user devices comprise phones, computers, vehicles, robots, and sensors. The wireless communication networks have Radio Access Networks (RANs) that exchange wireless signals over frequency channels with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

The RANs comprise antennas, Tower Mounted Amplifiers (TMAs), radios, and Baseband Units (BBU). The antennas receive wireless signals from wireless user devices and convert the wireless signals into corresponding electrical signals. The antennas transfer the electrical signals to the TMAs which boost the signal strength of the electrical signals. The TMAs transfer the amplified electrical signals to the radio. The radios convert the electrical signals into corresponding digital signals and transfer the digital signals to the BBUs. The BBUs process the digital signals to extract data user data from the wireless user devices. The BBUs transfer the user data to external systems.

The TMAs improve the uplink signal strength of wireless user devices that are far away from the radio access network so that the far away wireless user devices can transmit to the RANs. However, the TMAs overamplify signals from wireless user devices that are close to the RAN. When the TMAs overamplify the signals, the radios become energy saturated. Energy saturation fouls the electrical components of the radios. Unfortunately, the RANs do not effectively and efficiently mitigate energy saturation in the radios caused by TMA overamplification.

TECHNICAL OVERVIEW

A Radio Access Network (RAN) is configured to serve wireless User Equipment (UE). The RAN comprises a Tower Mounted Amplifier (TMA) and a Baseband Unit (BBU). The BBU determines an amount of proximate wireless UEs that have transmit power levels that fall below a proximity threshold. The BBU determines when the amount of the proximate UEs exceeds a concentration threshold. When the amount of the proximate UEs exceeds the concentration threshold, the BBU schedules the proximate wireless UEs to use proximate-UE Transmit Time Intervals (TTIs) and schedules other wireless UEs to use other TTIs. The BBU transfers control signals to deactivate TMA amplification during the proximate-UE TTIs and to activate the TMA amplification during the other TTIs. The TMA receives UE signals. In response to the control signals, the TMA deactivates the TMA amplification on the UE signals during the proximate-UE TTIs and activates the TMA amplification on the UE signals during the other TTIs.

DETAILED DESCRIPTION

Figure 1:
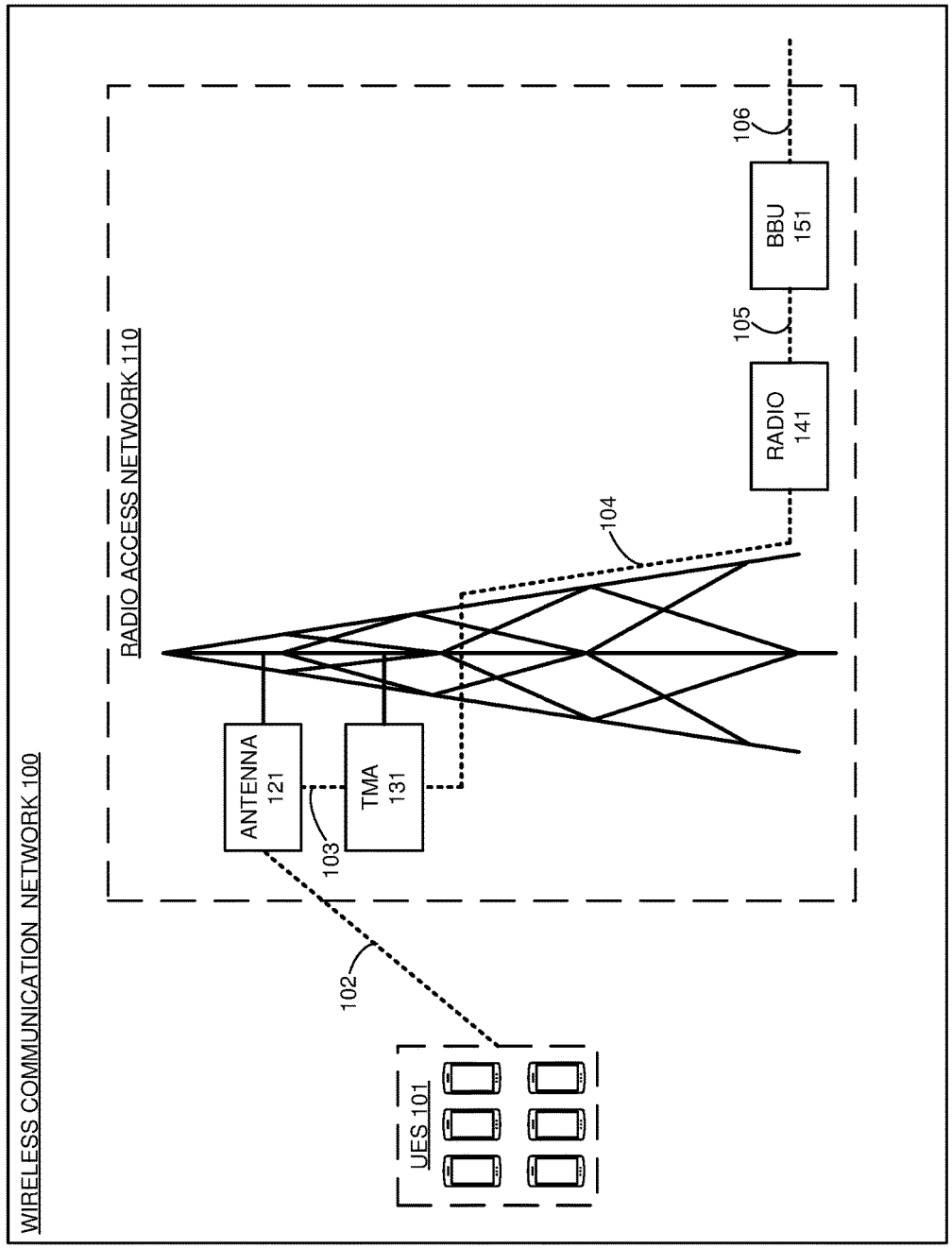
FIG. 1 illustrates a Radio Access Network (RAN) to control Tower Mounted Amplifier (TMA) amplification based on User Equipment (UE) concentration.

FIG. 1 illustrates wireless communication network 100. Wireless communication network 100 provides wireless data services to UEs 101 like machine-control, internet-access, media-streaming, social-networking, and/or some other type of wireless networking product. Wireless communication network 100 comprises wireless UEs 101 and Radio Access Network (RAN) 110. RAN 110 comprises links 102-106, antenna 121, TMA 131, radio 141, and Baseband Unit (BBU) 151. Wireless UEs 101 comprises proximate UEs that are geographically close to RAN 110 and other UEs that are geographically further away from RAN 110 than the proximate UEs.

Various examples of network operation and configuration are described herein. In some examples, RAN 110 controls TMA amplification based on UE concentration. BBU 151 determines the amount of proximate wireless UEs of UEs 101 that have transmit power levels that fall below a proximity threshold. BBU 151 determines when the amount of the proximate UEs exceeds a concentration threshold. The concentration threshold indicates when there is a large amount of UEs in the proximity of antenna 121. When the amount of the proximate UEs exceeds the concentration threshold, BBU 151 schedules the proximate wireless UEs to use proximate UE Transmit Time Intervals (TTIs) and schedules other wireless UEs of UEs 101 to use other TTIs. The TTIs indicate when UEs 101 can transmit wireless signals to RAN 110. BBU 151 transfers control signals to deactivate TMA amplification during the proximate UE TTIs and to activate the TMA amplification during the other TTIs. For example, the control signals may deactivate amplifiers in TMA 131 when the proximate UEs of UEs 101 are scheduled to transmit and activate the amplifiers in TMA 131 when the other UEs of UEs 101 are scheduled to transmit. TMA 131 receives UE signals. In response to the control signals, TMA 131 deactivates the TMA amplification on the UE signals during the proximate UE TTIs and activates the TMA amplification on the UE signals during the other TTIs. Advantageously, RAN 110 effectively and efficiently controls signal amplification in TMA 131 to inhibit energy saturation in radio 141. Moreover, RAN 110 controls UE TTIs to inhibit UEs in close proximity to RAN 110 from transmitting when the amplifiers in TMA 131 are active.

UEs 101 comprise antennas, amplifiers, filters, modulation, analog/digital interfaces, microprocessors, software, memories, transceivers, bus circuitry, and the like. Antenna 121 comprises antennas, transceivers, and the like. TMA 131 comprises amplifiers, filters, microprocessors, software, memories, transceivers, bus circuitry, and the like. Radio 141 comprises amplifiers, filters, modulation, analog/digital interfaces, microprocessors, software, memories, transceivers, bus circuitry, and the like. BBU 151 comprises microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein. Although UEs 101 are depicted as a smartphones, UEs 101 might instead comprise computers, robots, vehicles, or other data appliances with wireless communication circuitry.

RAN 110 comprises Fifth Generation New Radio (5GNR) gNodeBs, Fifth Generation Radio Access Technology (5G RAT) nodes, Evolved Universal Terrestrial Radio Access Network Dual Connectivity (EN-DC) nodes, 5G EN-DC access nodes, Long Term Evolution (LTE) eNodeBs, WIFI hotspots, Low-Power Wide Area Network (LP-WAN) nodes, and/or some other wireless network apparatus. Antenna 121 and TMA 131 are mounted onto the tower of RAN 110 while radio 141 and BBU 151 are positioned at a lower elevation on the ground, however other mounting arrangements of the constituent components of RAN 110 may be implemented. RAN 110 is depicted as a tower but RAN 110 may comprise other mounting structures or no mounting structure at all.

Wireless links 102-106 use over-the-air air electromagnetic frequencies in the low-band, mid-band, high-band, or some other portion of the electromagnetic spectrum. Wireless links 102 use protocols like 5GNR, LTE, Institute of Electrical and Electronic Engineers (IEEE) 802.11 (WIFI), LP-WAN, and/or some other format of wireless protocol. Links 103-106 use metal, glass, air, or some other media. Links 103-106 use IEEE 802.3 (Ethernet), Time Division Multiplex (TDM), Data Over Cable System Interface Specification (DOCSIS), Internet Protocol (IP), Hypertext Transfer Protocol (HTTP), Fifth Generation Core (5GC), 5GNR, LTE, WIFI, virtual switching, inter-processor communication, bus interfaces, and/or some other data communication protocols. Links 102-106 may comprise intermediate network elements like relays, routers, and controllers.

Figure 2:
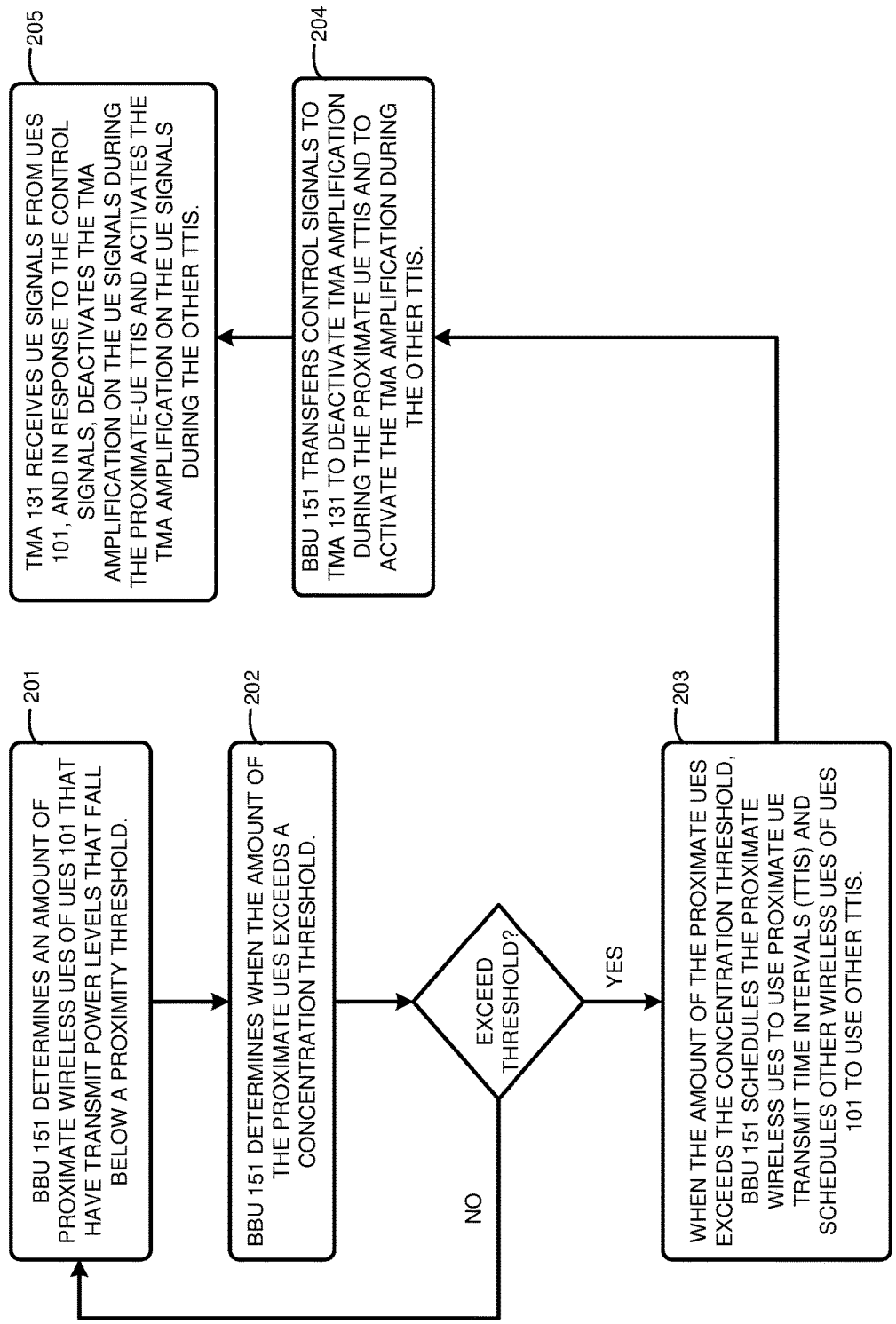
FIG. 2 illustrates an exemplary operation of the RAN to control TMA amplification based on UE concentration.

FIG. 2 illustrates an exemplary operation of RAN 110 to control TMA amplification based on UE concentration. In other examples, the operation and structure of RAN 110 may be different. BBU 151 determines an amount of proximate wireless UEs of UEs 101 that have transmit power levels that fall below a proximity threshold (201). BBU 151 determines when the amount of the proximate UEs exceeds a concentration threshold (202). If BBU 151 determines the amount of proximate UEs does not exceed the concentration threshold, then BBU 151 redetermines the amount of proximate UEs. Otherwise, when the amount of the proximate UEs exceeds the concentration threshold, BBU 151 schedules the proximate wireless UEs to use proximate UE TTIs and schedules other wireless UEs of UEs 101 to use other TTIs (203). For example, BBU 151 may schedule the proximate UEs to transmit during a first period of time using a first set of resource blocks and schedule the other UEs to transmit during a second, non-overlapping, period of time using a second set of resource blocks to selectively amplify the UE signals. BBU 151 transfers control signals to TMA 131 to deactivate TMA amplification during the proximate UE TTIs and to activate the TMA amplification during the other TTIs (204). TMA 131 receives UE signals from UEs 101, and in response to the control signals, deactivates the TMA amplification on the UE signals during the proximate UE TTIs and activates the TMA amplification on the UE signals during the other TTIs (205).

Figure 3:
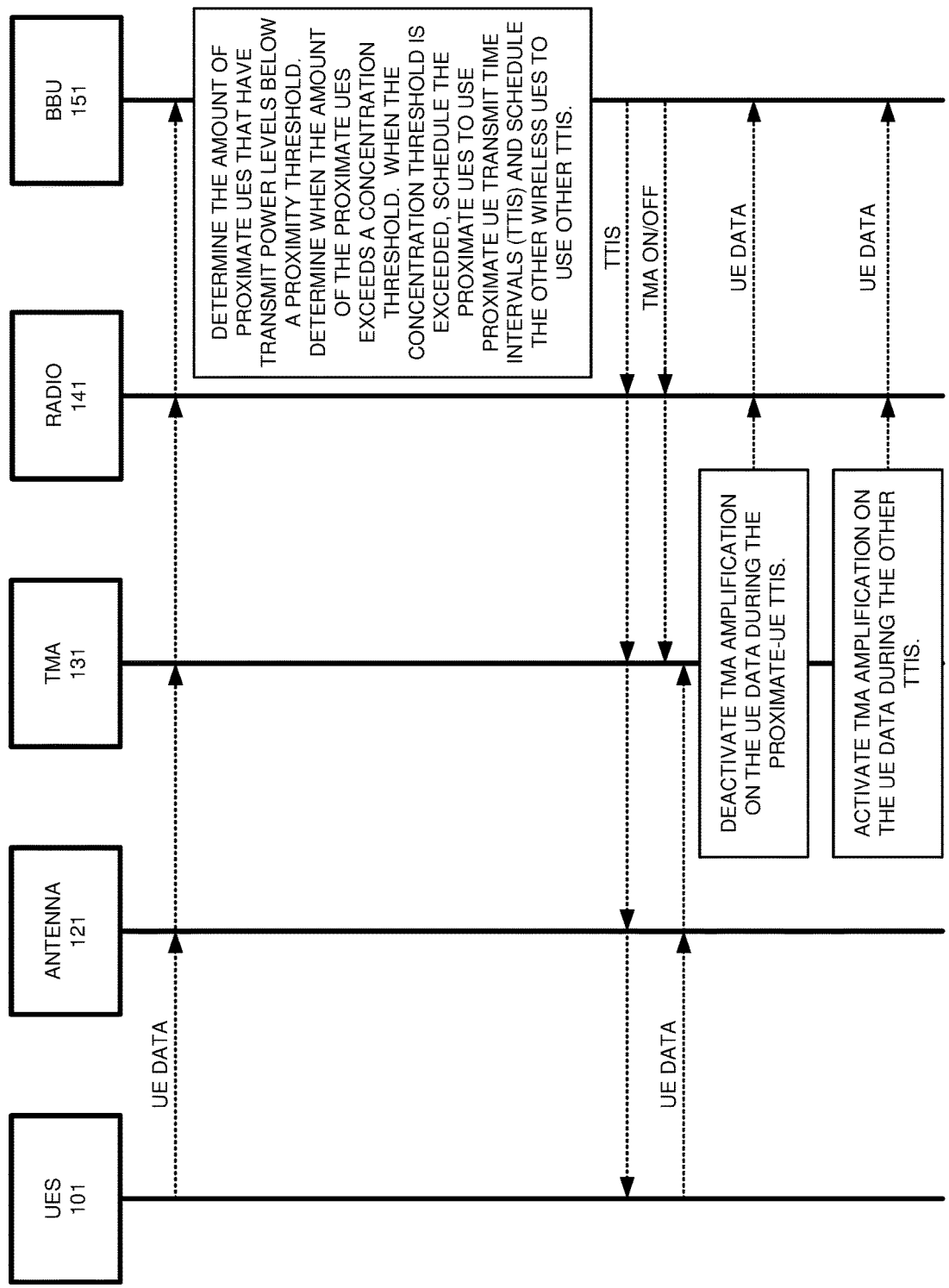
FIG. 3 illustrates an exemplary operation of the RAN to control TMA amplification based on UE concentration.

FIG. 3 illustrates an exemplary operation of RAN 110 to control TMA amplification based on UE concentration. In other examples, the operation and structure of RAN 110 may differ. UEs 101 transfer UE data to BBU 151 over antenna 121, TMA 131, and radio 141. BBU 151 receives the UE data and determines the amount of proximate UEs of UEs 101 that have transmit power levels below a proximity threshold. For example, BBU 151 may determine that a UE is proximate based UE signal path loss. The proximity threshold may comprise a transmit power value. BBU 151 determines when the amount of proximate UEs exceeds a concentration threshold. For example, BBU 151 may apply a data structure to determine that the fraction of proximate UEs of UEs 101 exceeds a concentration threshold value or may implement some other computational method to determine UE concentration.

If BBU 151 determines that the concentration threshold has not been exceeded, then BBU 151 continues to determine the amount of proximate UEs. When BBU 151 determines that the concentration threshold has been exceeded, BBU 151 schedules proximate UE Transmit Time Intervals (TTIs) for the proximate UEs and schedules other UE TTIs for the other UEs. The TTIs indicate when UEs 101 can transmit uplink UE data to BBU 151 over antenna 121, TMA 131, and radio 141. BBU 151 transfers the proximate UE TTIs to the proximate UEs of UEs 101 and transfers the other UE TTIs to the other UEs of UEs 101 over radio 141, TMA 131, and antenna 121.

BBU 151 transfers TMA on/off control signaling to TMA 131. The TMA on/off signals activate and deactivate TMA amplification in TMA 131. BBU 151 may transfer the TMA on/off control signaling to TMA 131 over an enhanced Common Public Radio Interface (eCPRI) link and an Antenna Interface Standards Group (AISG) link. Typically, BBU 151 transfers the on/off control signaling to TMA 131 to inhibit energy saturation in radio 141. In some examples, BBU 151 may instead transfer the UE TTIs to TMA 131 and TMA 131 may use the UE TTIs to selectively apply TMA amplification to the UE data.

The proximate UEs of UEs 101 transfer UE data to TMA 131 over antenna 121 during the proximate UE TTIs. The other UEs of UEs 101 transfer UE data to TMA 131 over antenna 121 during the other UE TTIs. In response to the TMA on/off control signaling, TMA 131 deactivates TMA amplification on the UE data during the proximate UE TTIs and activates TMA amplification on the UE data during the other TTIs. TMA transfers the UE data to BBU 151 over radio 141.

Figure 4:
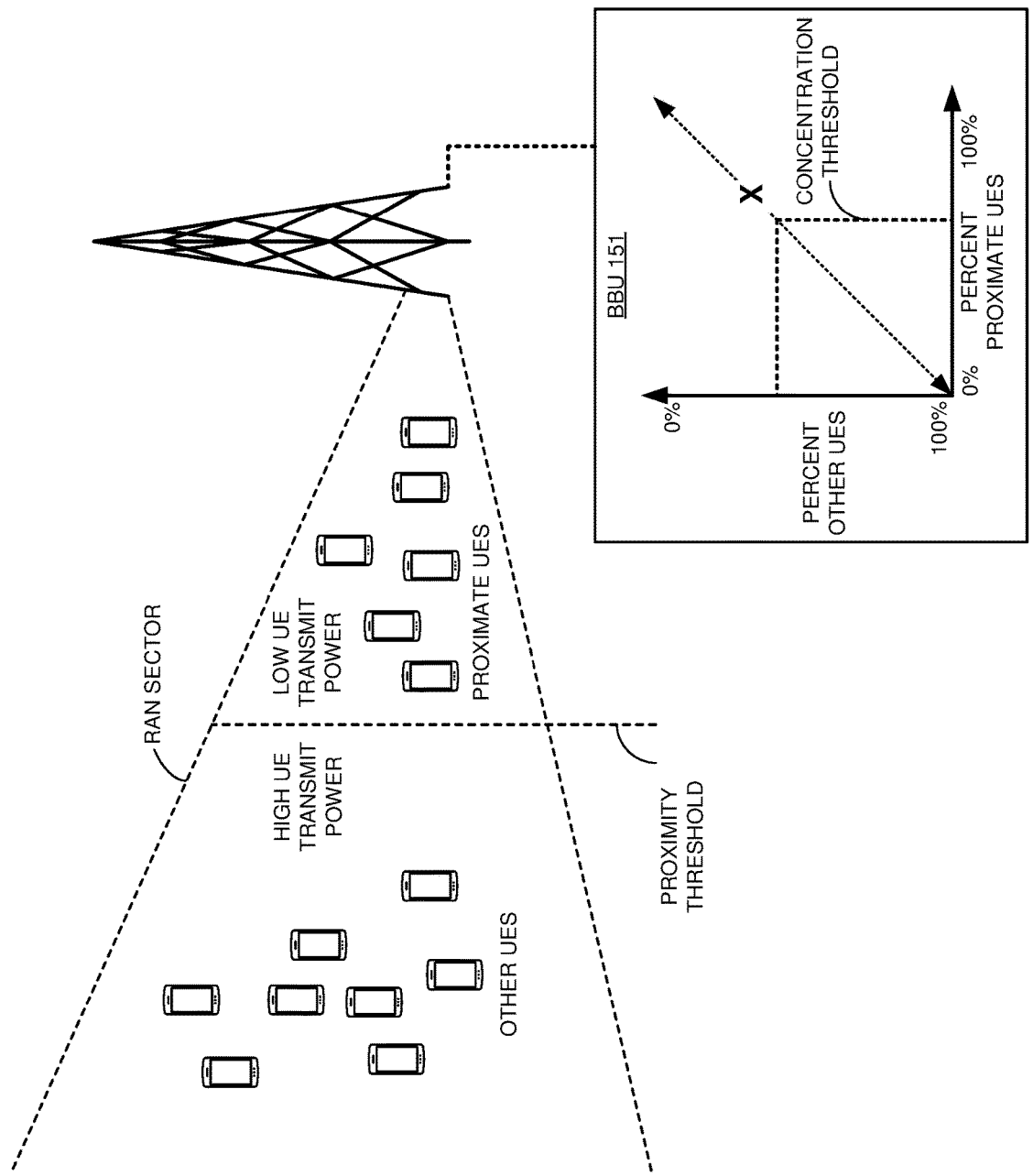
FIG. 4 illustrates a Baseband Unite (BBU) to control TMA amplification based on UE concentration.

FIG. 4 illustrates an exemplary operation of BBU 151 to control TMA amplification based on UE concentration. In other examples, the operation and structure of BBU 151 may be different. As shown in FIG. 4, BBU 151 is depicted serving proximate UEs and other UEs that are in a RAN sector. The RAN sector comprises a geographic region where BBU 151 provides wireless communication service via a radio tower. The RAN sector is divided into a "Low UE Transmit Power" section and a "High UE Transmit Power" section that is separated by a proximity threshold. The proximity threshold indicates a UE transmit power level. The proximate UEs are located in the "Low UE transmit Power" section while the other UEs are located in the "High UE transmit Power" section. The other UEs in the "High UE Transmit Power" section transmit signals to the radio tower at a higher energy level than the proximate UEs in the "Low UE Transmit Power" section. The proximate UEs are physically closer to the radio tower than the other UEs. The UEs are proximate when their UE transmit power level is below the proximity threshold.

BBU 151 hosts a data structure that implements the graph shown on FIG. 4. The vertical axis of the graph indicates the percentage of other UEs served by BBU 151: %100 to 0%. The horizontal axis indicates the percentage of proximate UEs served by BBU 151: 0% to 100%. These numbers are illustrative and other values could be used. For example, the axes of the graph could indicate the total number of proximate UEs and the total number of other UEs. As indicated by the X mark on the graph, a percentage of around 60% of proximate UEs corresponds to 40% of other UEs. In this example, the concentration threshold is set at around 50% of proximate UEs however other threshold values could be used. BBU 151 determines the proximity threshold and which UEs are proximate UEs based on their transmit power. When a UE's transmit power falls below the proximity threshold, BBU 151 classifies that UE as a proximate UE. When a UE's transmit power is above the proximity threshold, BBU 151 classifies that UE as an other UE. Typically, BBU 151 determines signal path loss to determine the transmit power levels for the UEs. BBU 151 determines what percentage of UEs are proximate UEs and implements the data structure to determine if the concentration threshold is exceeded. In other examples, BBU 151 may implement a different type of data structure than the one illustrated on FIG. 4. When the concentration threshold is exceeded, BBU 151 schedules the proximate UEs on proximate UE TTIs and schedules the other UEs on other UE TTIs. BBU 151 deactivates TMA amplification in the radio tower during the proximate UE TTIs. BBU 151 activates TMA amplification in the radio tower during the other UE TTIs.

Figure 5:
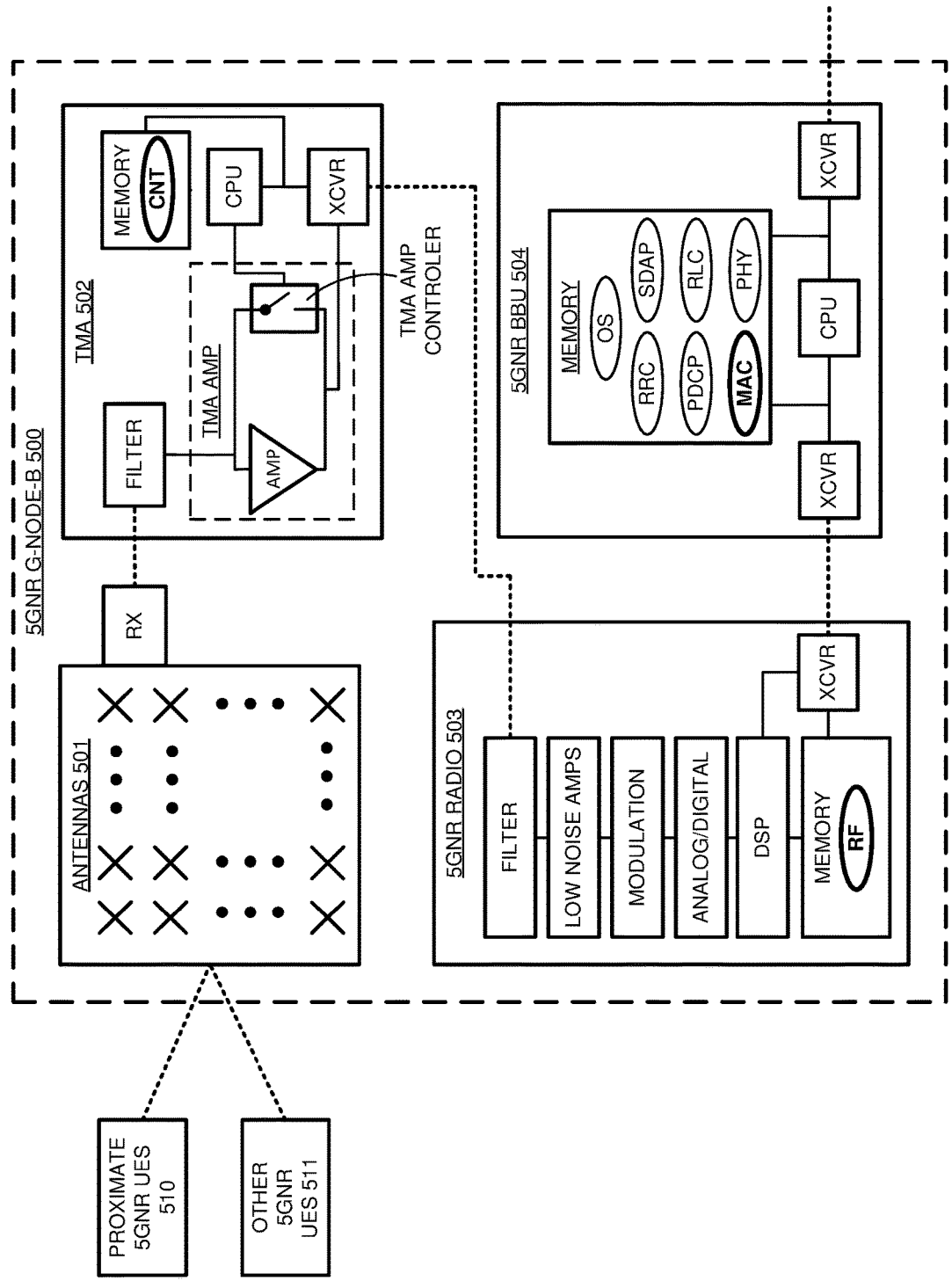
FIG. 5 illustrates a Fifth Generation New Radio (5GNR) gNodeB to control TMA amplification based on UE concentration.

FIG. 5 illustrates 5GNR gNodeB 500 to control Tower Mounted Amplifier (TMA) amplification based on UE concentration. 5GNR gNodeB 500 is an example of Radio Access Network (RAN) 110, although RAN 110 may differ. UEs 510-511 are examples of UEs 101, although UEs 101 may differ. 5GNR gNodeB 500 comprises antennas 501, TMA radio 502, 5GNR radio 503, and 5GNR BBU 504. Antennas 501 comprise individual antenna elements and an uplink transceiver (RX). Typically, the antenna elements comprise dipole antennas that are arranged in a grid pattern as illustrated in FIG. 5. TMA 502 comprises filters, memory, Central Processing Units (CPUs), transceivers (XCVR), and a TMA amplifier (TMA AMP) that are connected over bus circuitry. The TMA amplifier comprises amplifiers and a TMA amplifier controller. The TMA amplifier controller activates and deactivates the amplifiers in the TMA amplifier in response to control signaling. The memory in TMA 502 stores functions like amplifier controller function (CNT). 5NGN radios 503 comprise antennas, low noise amplifiers, filters, modulation, analog-to-digital interfaces, Digital Signal Processors (DSP), memory, and transceivers that are coupled over bus circuitry. The memory in 5GNR radio 503 stores functions like 5GNR Radio Frequency Function (RF). 5GNR BBU 504 comprises memories, CPUs, and transceivers that are coupled over bus circuitry. The memories in BBU 504 stores operating systems (OS) and network applications like Physical Layer (PHY), Media Access Control (MAC), Radio Link Control (RLC), Packet Data Convergence Protocol (PDCP), Service Data Adaptation Protocol (SDAP), and Radio Resource Control (RRC). The CPUs in 5GNR BBU 504 execute the operating systems, PHY, MAC, RLC, PDCP, SDAP, and RRC to exchange network signaling and user data with proximate UEs 510 and other UEs 511.

Proximate UEs 510 are wirelessly coupled to antennas 501 over 5GNR links. Other UEs 511 are wirelessly coupled to antennas 501 over 5GNR links. The uplink transceiver in antennas 501 is coupled to a filter in TMA 502 over an uplink antenna link. The transceiver in TMA 502 is coupled to a filter in 5GNR radio 503 over Antenna Interface Standards Group (AISG) links. The transceiver in 5GNR radio 503 is coupled to a transceiver in 5GNR BBU 504 over enhanced Common Public Radio Interface (eCPRI) links. Typically, Antennas 501 and TMA 502 are mounted on a tower (not shown) of 5GNR gNodeB 500 while 5GNR radio 503 and 5GNR BBU 504 are positioned on the ground near the tower and at a lower elevation, however other mounting arrangements are possible.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping. Amplifier controller functions comprise TMA amplifier activation and TMA amplifier deactivation. RF functions comprise signal routing, radio control, and radio status reporting.

In operation, proximate 5GNR UEs 510 and other 5GNR UEs 511 wirelessly attach to 5GNR radio 503 over antennas 501 and TMA 502. Antennas 501 receive wireless 5GNR signals from UEs 510-511 that transport Uplink (UL) 5GNR signaling and UL 5GNR data. Transceivers in antennas 501 transfer corresponding electrical UL signals to filters in TMA 502 which attenuate unwanted energy. The amplifiers in the TMA amplifier boost the received UL signals. Transceivers in TMA 502 transfer the amplified UL signals through triplexers to filters in 5GNR radio 503 which attenuate unwanted energy. In 5GNR radio 503, low noise amplifiers boost the UL signals and demodulators down-convert the UL signals from their carrier frequency. The analog/digital interfaces convert the analog UL signals into digital UL signals for the DSP. The DSP recovers UL 5GNR symbols from the UL digital signals. Transceivers in 5GNR radio 503 transfer the UL 5GNR symbols to transceivers in 5GNR BBU 504. The CPUs in 5GNR BBU 504 execute the network applications to process the UL 5GNR symbols and recover the UL 5GNR signaling and the UL 5GNR data. The 5GNR RRC in 5GNR BBU 504 processes the UL 5GNR signaling to generate new UL N2 signaling. The 5GNR RRC in 5GNR BBU 504 receives and processes Downlink (DL) N2 signaling to generate new DL 5GNR signaling. The 5GNR RRC transfers the new UL N2 signaling over backhaul links. The 5GNR SDAP in 5GNR BBU 504 transfers the UL 5GNR data over backhaul links. The 5GNR SDAP receives DL 5GNR data.

The 5GNR network applications process the new DL 5GNR signaling and the DL 5GNR data to generate corresponding DL 5GNR symbols that carry the DL 5GNR signaling and DL 5GNR data. In 5GNR radio 601, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The low-noise amplifiers boost the modulated DL signals for the filters which attenuate unwanted out-of-band energy. The filters transfer the filtered DL signals through triplexers to transceivers in TMA 502. The filters in TMA 502 attenuate unwanted energy and transfer the DL signals to downlink transceivers in antennas 501. The electrical DL signals drive the antenna elements in antennas 501 to emit corresponding wireless 5GNR signals that transport the DL 5GNR signaling and DL 5GNR data to proximate 5GNR UEs 510 and other 5GNR UEs 511.

The MAC 5GNR in BBU 504 determines UE UL path loss to determine UE UL transmit power levels. The MAC determines the total number of proximate 5GNR UEs 510 based on the transmit power levels. The MAC determines the total number of other 5GNR UEs 511 based on the transmit power levels. The MAC determines the percentage of UEs 510-511 that are proximate. Typically, the MAC divides the total number of proximate UEs 510 by the total number of UEs 510-511 to determine the percentage of UEs that are proximate. The MAC determines when the percentage of proximate UEs exceeds a concentration threshold. An exemplary concentration threshold is 50% proximate UEs, however other threshold values be implemented by the MAC.

The MAC determines that the concentration threshold is exceeded. The MAC schedules proximate UL Transmit Time Intervals (TTIs) for proximate UEs 510. The MAC schedules other UL TTIs for other UEs 511. The TTIs indicate time intervals and resource blocks that UEs 510-511 use to transmit UL signaling and UL data. The proximate UL TTIs and the other UL TTIs comprise non-overlapping time intervals. The MAC transfers the proximate UL TTIs to proximate 5GNR UEs 510 over 5GNR radio 503, TMA 502, and antennas 501. The MAC transfers the other UL TTIs to other UEs 511 over 5GNR radio 503, TMA 502, and antennas 501. UEs 510-511 receive the TTIs.

During the proximate UL TTIs, the MAC in 5GNR BBU 504 transfers control signals over the eCPRI links to transceivers in 5GNR radio 503 to inhibit energy saturation in the low noise amplifiers in 5GNR radio 503. The RF in radio 503 routes the control signals to transceivers in TMA 502 over the AISG links. The CPU in TMA 502 executes the amplifier controller function. In response to the control signals, the amplifier controller function drives the TMA amplifier controller to bypass (and deactivate) the amplifiers in the TMA amplifier. Proximate 5GNR UEs 510 wirelessly transfer 5GNR signals that transport UL 5GNR signaling and UL 5GNR data to antennas 501. Antennas 501 receive the wireless 5GNR signals. Antennas 501 transfer corresponding electrical UL signals to filters in TMA 502 which attenuate unwanted energy. The transceivers in TMA 502 transfer the non-amplified UL signals through triplexers to filters in 5GNR radio 503 which attenuate unwanted energy. In 5GNR radio 503, low noise amplifiers boost the UL signals and demodulators down-convert the UL signals from their carrier frequency. The analog/digital interfaces convert the analog UL signals into digital UL signals for the DSP. The DSP recovers UL 5GNR symbols from the UL digital signals. Transceivers in 5GNR radio 503 transfer the UL 5GNR symbols to transceivers in 5GNR BBU 504. The CPUs in 5GNR BBU 504 execute the network applications to process the UL 5GNR symbols and recover the UL 5GNR signaling and the UL 5GNR data.

During the other UL TTIs, the MAC transfers control signals over the eCPRI links to transceivers in 5GNR radio 503 to activate the amplifiers in the TMA amplifier. The RF in radio 503 routes the control signals to transceivers in TMA 502 over the AISG links. The CPU in TMA 502 executes the amplifier controller function. In response to the control signals, the amplifier controller function drives the TMA amplifier controller to activate the amplifiers in the TMA amplifier. Other 5GNR UEs 511 wirelessly transfer 5GNR signals that transport UL 5GNR signaling and UL 5GNR data to antennas 501. Antennas 501 receive the wireless 5GNR signals. Antennas 501 transfer corresponding electrical UL signals to filters in TMA 502 which attenuate unwanted energy. The amplifiers in the TMA amplifier boost the UL signals from other UEs 511. The transceivers in TMA 502 transfer the amplified UL signals through triplexers to filters in 5GNR radio 503 which attenuate unwanted energy. In 5GNR radio 503, low noise amplifiers boost the UL signals and demodulators down-convert the UL signals from their carrier frequency. The analog/digital interfaces convert the analog UL signals into digital UL signals for the DSP. The DSP recovers UL 5GNR symbols from the UL digital signals. Transceivers in 5GNR radio 503 transfer the UL 5GNR symbols to transceivers in 5GNR BBU 504. The CPUs in 5GNR BBU 504 execute the network applications to process the UL 5GNR symbols and recover the UL 5GNR signaling and the UL 5GNR data.

Figure 6:
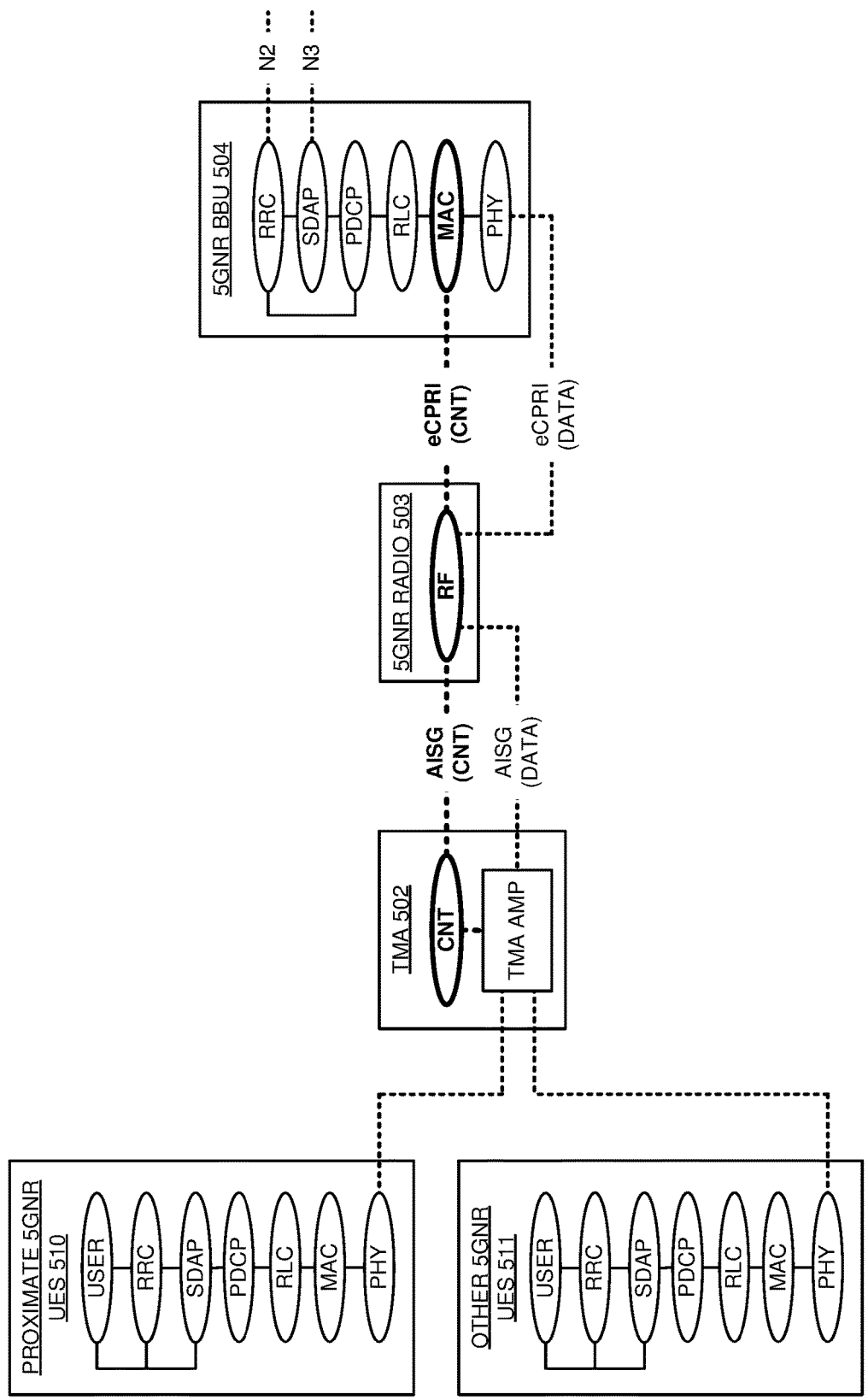
FIG. 6 illustrates an exemplary operation of a 5GNR BBU, radio, and TMA to control TMA amplification based on UE concentration.

FIG. 6 illustrates an exemplary operation of TMA 502, 5GNR radio 503, 5GNR BBU 504, and UEs 510-511 to control TMA amplification based on UE concentration. The operation and structure of TMA 502, 5GNR radio 503, 5GNR BBU 504, and UEs 510-511 may differ in other examples. In 5GNR UEs 510-511, user applications request data communication, and the 5GNR RRCs in UEs 510-511 attach to the 5GNR RRC in 5GNR BBU 504 over the 5GNR PDCPs, RLCs, MACs, and PHYs. The 5GNR RRC in 5GNR BBU 504 sends requests for data services for 5GNR UEs 510-511 in N2 signaling over the backhaul links. The RRC in 5GNR BBU 504 receives network addressing and Quality-of-Service (QoS) for UEs 510-511 in N2 signaling. The 5GNR RRC in 5GNR BBU 504 transfers the network addresses and QOS to the 5GNR RRCs in UEs 510-511 over the PDCPs, RLCs, MACs, and PHYs.

The 5GNR MAC in BBU 504 determines the transmit power levels for UEs 510-511. The MAC determines the amount of proximate 5GNR UEs 510 based on the transmit power. The MAC determines the amount of other UEs 511 based on the transmit power. The MAC determines the percentage of UEs 510-511 that are proximate. The 5GNR MAC determines that the percentage of proximate UEs exceeds a concentration threshold. In response to the exceeded concentration threshold, the 5GNR MAC schedules proximate UL TTIs for proximate UEs 510 and schedules other UL TTIs for other UEs 511. The 5GNR MAC transfers the proximate UL TTIs to the MACs in proximate UEs 510 over the PHYs. The MAC transfers the other UL TTIs to MACs in the other UEs 511 over the PHYs.

During the proximate UL TTIs, the 5GNR MAC in 5GNR BBU 504 transfers control signals to the RF in 5GNR radio 503 over eCPRI control links. The RF in radio 503 transfers the control signals to the amplifier controller function in TMA 502 over the AISG control links. In response to the control signals, the amplifier controller function in TMA 502 deactivates TMA amplification in TMA 502. The RRCs in proximate UEs 510 transfer UL 5GNR signaling to the 5GNR RRC in BBU 504 over the SDAPs, PDCPs, RLCs, MACs, and PHYs. The SDAPs in UEs 510 transfer UL 5GNR data to the 5GNR SDAP in BBU 504 over the PDCPs, RLCs, MACs, and PHYs. TMA 502 receives the UL signals and transfers the UL 5GNR data and UL 5GNR signals to the RF over the AISG data links without amplifying UL 5GNR signals. The RF transfers the 5GNR signaling to the 5GNR RRC in BBU 504 via the eCPRI data links over the SDAP, PDCP, RLC, MAC, and PHY. The RF in radio 503 transfers the 5GNR data to the 5GNR SDAP in BBU 504 via the eCPRI data links over the PDCP, RLC, MAC, and PHY. The RRC in BBU 504 transfers the 5GNR signaling in N2 signaling over backhaul links. The SDAP in BBU 504 transfers the 5GNR data in N3 signaling over backhaul links.

During the other UL TTIs, the 5GNR MAC in 5GNR BBU 504 transfers control signals to the RF in 5GNR radio 503 over eCPRI control links. The RF in radio 503 transfers the control signals to the amplifier controller function in TMA 502 over the AISG control links. In response to the control signals, the amplifier controller function activates TMA amplification in TMA 502. The RRCs in other UEs 511 transfer UL 5GNR signaling to the 5GNR RRC in BBU 504 over the SDAPs, PDCPs, RLCs, MACs, and PHYs. The SDAPs in UEs 510 transfer UL 5GNR data to the 5GNR SDAP in BBU 504 over the PDCPs, RLCs, MACs, and PHYs. TMA 502 receives the UL 5GNR signals. TMA 502 amplifies the UL 5GNR signals and transfers the UL 5GNR signals to the RF in radio 503 over the AISG data. The RF in radio 503 transfers the 5GNR signaling to the 5GNR RRC in BBU 504 via the eCPRI data links over the SDAP, PDCP, RLC, MAC, and PHY. The RF in radio 503 transfers the 5GNR data to the 5GNR SDAP in BBU 504 via the eCPRI data links over the PDCP, RLC, MAC, and PHY. The RRC in BBU 504 transfers the 5GNR signaling in N2 signaling over backhaul links. The SDAP in BBU 504 transfers the 5GNR data in N3 signaling over backhaul links.

Although the eCPRI control links and eCPRI data links are shown as separate links, in some examples the eCPRI control links and eCPRI data links may be combined into a signal eCPRI control/data link. Although the AISG control links and AISG data links are shown as separate links, in some examples the AISG control links and AISG data links may be combined into a signal AISG control/data link.

The wireless data network circuitry described above comprises computer hardware and software that form special-purpose network circuitry to control TMA amplification based on UE concentration. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to control TMA amplification based on UE concentration.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Radio Access Network (RAN) that comprises a Tower Mounted Amplifier (TMA), the method comprising:
    a Baseband Unit (BBU) determining an amount of proximate wireless User Equipment (UEs) that have transmit power levels that fall below a proximity threshold and determining when the amount of the proximate UEs exceeds a concentration threshold;
    when the amount of the proximate UEs exceeds the concentration threshold, the BBU scheduling the proximate wireless UEs to use proximate-UE Transmit Time Intervals (TTIs) and scheduling other wireless UEs to use other TTIs;
    the BBU transferring control signals to deactivate TMA amplification during the proximate-UE TTIs and to activate the TMA amplification during the other TTIs; and
    the TMA receiving UE signals, and in response to the control signals, deactivating TMA amplification on the UE signals during the proximate-UE TTIs and activating the TMA amplification on the UE signals during the other TTIs.

2. The method of claim 1 wherein the BBU determining an amount of the proximate wireless UEs comprises the BBU executing a Media Access Control (MAC) and the MAC determining the amount of the proximate wireless UEs.

3. The method of claim 1 wherein the BBU determining when the amount of the proximate UEs exceeds a concentration threshold comprises the BBU executing a Media Access Control (MAC) and the MAC determining when the amount of the proximate UEs exceeds the concentration threshold.

4. The method of claim 1 wherein the BBU scheduling the proximate wireless UEs to use the proximate-UE TTIs and scheduling other wireless UEs to use the other TTIs comprises the BBU executing a Media Access Control (MAC) and the MAC scheduling the proximate wireless UEs to use the proximate-UE TTIs and scheduling other wireless UEs to use the other TTIs.

5. The method of claim 1 wherein the BBU transferring the control signals to deactivate the TMA amplification during the proximate-UE TTIs and to activate the TMA amplification during the other TTIs comprises the BBU executing a Media Access Control (MAC) and the MAC transferring the control signals to deactivate the TMA amplification during the proximate-UE TTIs and to activate the TMA amplification during the other TTIs.

6. The method of claim 1 wherein the BBU transferring the control signals to deactivate the TMA amplification and to activate the TMA amplification comprises the BBU executing a Media Access Control (MAC) and the MAC transferring the control signals to the TMA over an enhanced Common Public Radio Interface (eCPRI).

7. The method of claim 1 wherein the BBU transferring the control signals to deactivate the TMA amplification and to activate the TMA amplification comprises the BBU executing a Media Access Control (MAC) and the MAC transferring the control signals to the TMA over an Antenna Interface Standards Group (ASIG) link.

8. The method of claim 1 wherein:
the RAN comprises antennas, the TMA, a radio, and the BBU; and
the BBU transferring the control signals to deactivate TMA amplification during the proximate-UE TTIs comprises inhibiting energy saturation in the radio.

9. The method of claim 1 wherein:
the RAN comprises antennas, the TMA, a radio, and the BBU; and
the BBU transferring the control signals to deactivate TMA amplification during the proximate-UE TTIs comprises inhibiting energy saturation in a low-noise amplifier in the radio.

10. The method of claim 1 wherein:
the RAN comprises antennas, the TMA, a radio, and the BBU;
the radio and the BBU are positioned at a ground elevation; and
the antennas and the TMA are positioned at a higher elevation that is above the ground elevation.

11. A Radio Access Network (RAN) that comprises a Tower Mounted Amplifier (TMA), the RAN comprising:
a Baseband Unit (BBU) configured to determine an amount of proximate wireless User Equipment (UEs) that have transmit power levels that fall below a proximity threshold and determine when the amount of the proximate UEs exceeds a concentration threshold;
when the amount of the proximate UEs exceeds the concentration threshold, the BBU configured to schedule the proximate wireless UEs to use proximate-UE Transmit Time Intervals (TTIs) and schedule other wireless UEs to use other TTIs;
the BBU configured to transfer control signals to deactivate TMA amplification during the proximate-UE TTIs and to activate the TMA amplification during the other TTIs; and
the TMA configured to receive UE signals, and in response to the control signals, deactivate the TMA amplification on the UE signals during the proximate-UE TTIs and activate the TMA amplification on the UE signals during the other TTIs.

12. The RAN of claim 11 wherein the BBU is configured to execute a Media Access Control (MAC) and the MAC configured to determine the amount of the proximate wireless UEs.

13. The RAN of claim 11 wherein the BBU is configured to execute a Media Access Control (MAC) and the MAC is configured to determine when the amount of the proximate UEs exceeds the concentration threshold.

14. The RAN of claim 11 wherein the BBU is configured to execute a Media Access Control (MAC) and the MAC configured to schedule the proximate wireless UEs to use the proximate-UE TTIs and schedule other wireless UEs to use the other TTIs.

15. The RAN of claim 11 wherein the BBU is configured to execute a Media Access Control (MAC) and the MAC configured to transfer the control signals to deactivate the TMA amplification during the proximate-UE TTIs and to activate the TMA amplification during the other TTIs.

16. The RAN of claim 11 wherein the BBU is configured to execute a Media Access Control (MAC) and the MAC configured to transfer the control signals to the TMA over an enhanced Common Public Radio Interface (eCPRI).

17. The RAN of claim 11 wherein the BBU is configured to execute a Media Access Control (MAC) and the MAC configured to transfer the control signals to the TMA over an Antenna Interface Standards Group (ASIG) link.

18. The RAN of claim 11 wherein:
the RAN comprises antennas, the TMA, a radio, and the BBU; and
the BBU is configured to transfer the control signals to deactivate TMA amplification during the proximate-UE TTIs to inhibit energy saturation in the radio.

19. The RAN of claim 11 wherein:
the RAN comprises antennas, the TMA, a radio, and the BBU; and
the BBU is configured to transfer the control signals to deactivate TMA amplification during the proximate-UE TTIs to inhibit energy saturation in a low-noise amplifier in the radio.

20. The RAN of claim 11 wherein:
the RAN comprises antennas, the TMA, a radio, and the BBU;
the radio and the BBU are positioned at a ground elevation; and
the antennas and the TMA are positioned at a higher elevation that is above the ground elevation.

\* \* \* \* \*